United States Patent [19]

Pearsall, Jr.

[11] 3,965,397

[45] June 22, 1976

[54] MEANS FOR PREVENTING AN ELECTRICAL SHOCK HAZARD

[75] Inventor: George David Pearsall, Jr., Middletown, N.J.

[73] Assignee: Bell Telephone Laboratories, Incorporated, Murray Hill, N.J.

[22] Filed: May 1, 1975

[21] Appl. No.: 573,428

[52] U.S. Cl. ............................... 317/116; 337/205; 339/147 P; 174/5 R
[51] Int. Cl.² ....................................... H02B 1/18
[58] Field of Search .......... 200/50 B; 337/260, 264, 337/225, 222, 187, 188, 197, 205, 191, 192; 339/147 P; 317/99, 116, 9 A, 9 R; 174/5 R

[56] References Cited
UNITED STATES PATENTS

| | | | |
|---|---|---|---|
| 1,482,958 | 2/1924 | Ulrich | 337/205 |
| 1,678,131 | 7/1928 | Vaughn, Jr. | 200/50 A |
| 2,213,722 | 9/1940 | Smith | 219/517 |

*Primary Examiner*—Gerald P. Tolin
*Attorney, Agent, or Firm*—John Francis Moran

[57] ABSTRACT

An interlocking safety arrangement for electrically powered apparatus utilizes a conventional disengagable electrical connector and a standard fuse holder which are physically arranged so that the connector must be disengaged from its receptacle to gain access to the fuse holder. Since the electrical connector supplies power to the apparatus, disengagement disconnects the power and prevents the possibility of an electrical shock hazard from the terminals associated with the fuse.

3 Claims, 3 Drawing Figures

MEANS FOR PREVENTING AN ELECTRICAL SHOCK HAZARD

BACKGROUND OF THE INVENTION

This invention relates generally to arrangements for preventing electrical shock and, more particularly, to arrangements of the interlocking type wherein electrical power must be disconnected to gain access to normally electrically hot circuit components.

Electrically powered apparatus generally employ some kind of fused arrangement for protection against catastrophic malfunctions. Panel mounted fuse holders are frequently used to contain the fuses. Panel mounted fuse holders are convenient to use and offer the safety feature of partially concealed terminals, which is inherent in their construction. The latter advantage is only fully realized when the panel type fuse holder is electrically wired so that the inner terminal of the fuse holder is connected to the hot side of the power main. In other words, if the wiring is reversed so that the outer terminal is connected to the hot side of the power main, either within the apparatus or due to faulty wiring in the supply to the apparatus, removal of a fuse from its holder presents an occasion for an electrical shock hazard.

An object of this invention is to realize the safety advantage offered by an interlocked power connector through the use of a conventional disengagable electrical connector and a standard fuse holder.

SUMMARY OF THE INVENTION

In its broader aspects, the invention takes the form of a safety arrangement which utilizes a conventional disengagable electrical connector and a standard fuse holder which are mechanically and electrically arranged to provide the safety features inherent to an interlocking connector arrangement. In particular, the disengagable electrical connector supplies a powering potential to the apparatus and is mechanically mounted to obstruct access to a fuse in circuit with the powering potential. Accordingly, the electrical connector must be disengaged to provide access to the fuse, thereby insuring that the electrically powered apparatus is disconnected from a powering potential before contact can be made to electrical terminals associated with the fuse which would otherwise be potentially hot.

In an illustrative embodiment of the invention, the safety arrangement is mounted in a recessed cavity formed in the case of the apparatus. The fuse is mounted in a conventional panel mounted fuse holder on one side of the cavity. On the other side of the cavity, the disengagable electrical connector is mounted so that the female portion, which supplies electrical power to the apparatus, blocks access to the fuse in its holder. A feature of this cavity-type arrangement is that when the cavity is formed in the rear wall of the apparatus case the female portion of the electrical connector does not protrude outward from the rear of the apparatus case, thereby providing a flush rear mount.

DETAILED DESCRIPTION

Figure 1:
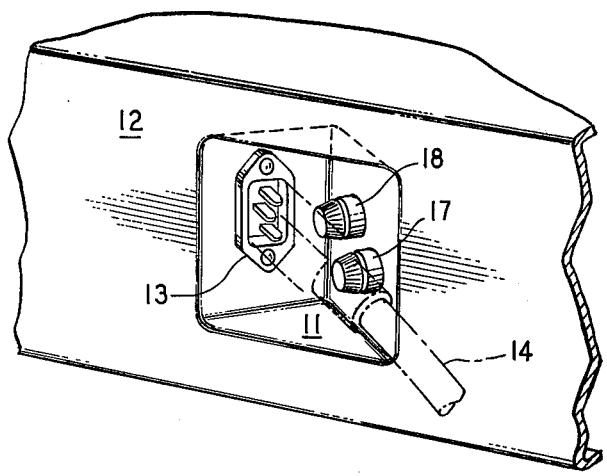
FIG. 1 depicts a perspective view of an embodiment of the invention in the rear of an apparatus case.

FIG. 1 depicts the safety arrangement within the recess of cavity 11. Cavity 11 is a triangular-shaped hollow formed within wall 12 of an apparatus case. Although cavity 11 may be positioned at any convenient location in an apparatus case if cavity 11 is formed in the rear wall of the apparatus case and the size of cavity 11 is large enough to completely contain a power connector the advantage of preventing a protrusion from the rear by the power connector is realized. Within cavity 11 on one wall is mounted a disengagable electrical connector assembly comprising a male connector 13 and a female connector 14. The female connector 14 is shown in phantom to show clearly panel fuse holders 17 and 18 mounted on the other vertical wall of cavity 11. It should be noted that connectors 13 and 14 and also panel fuse holders 17 and 18 are conventional hardware which are commonly used in the art.

Female connector 14 supplies power from a power main to the apparatus of FIG. 1 via the male connector portion 13. In order to gain access to fuse holders 17 and 18, it is necessary to disengage female connector 14 from male connector 13. Since female connector 14 supplies electrical power to the apparatus of FIG. 1, the disengagement deactivates the terminals within fuse holders 17 and 18 and thus prevents an occasion for an electrical shock hazard.

Figure 2:
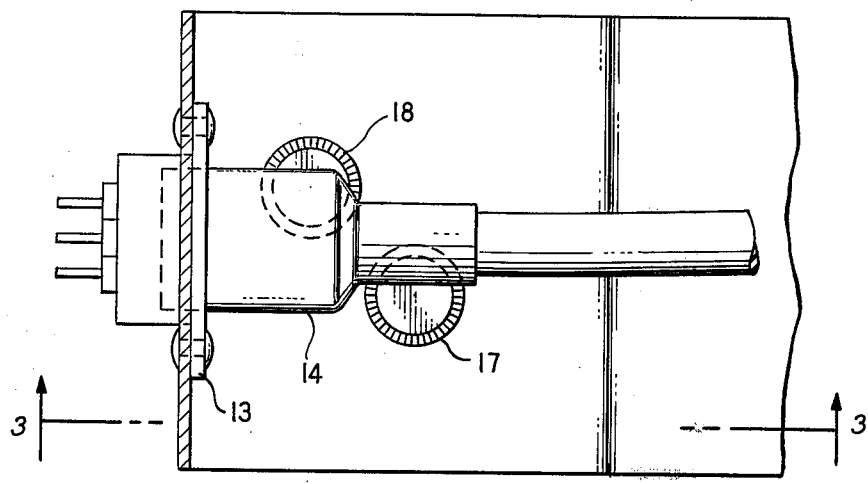
FIG. 2 illustrates another view of the arrangement of FIG. 1.
Figure 3:
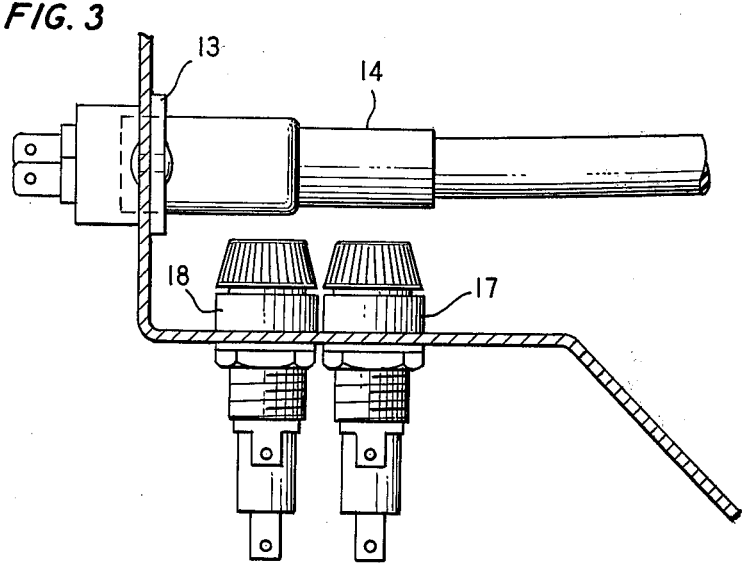
FIG. 3 is a cross-section view of FIG. 2.

FIGS. 2 and 3 serve to illustrate further the spatial relationship between female connector 14 and fuse holders 17 and 18. FIG. 2 represents the view of FIG. 1 which is perpendicular to the wall of cavity 11 on which fuse holders 17 and 18 are mounted. FIG. 3 illustrates the view of FIG. 2 in accordance with the cross-section designation of FIG. 2. From FIG. 3 it is apparent that although the caps to fuse holders 17 and 18 may be loosened to some extent without disengaging of female connector 14 the latter must be completely disengaged in order to remove the cartridge-type fuses contained in holders 17 and 18.

Wiring connections are not shown between the terminals of male connector 13 and fuse holders 17 and 18 in any of the figures for the sake of simplicity. It should be understood, however, that at least fuse holder 18 is connected in circuit with the powering terminals of male connector 13. Fuse holder 17 may also be in circuit with the powering terminals of male connector 13, or fuse holder 17 may not be connected, and therefore only serve to hold a spare fuse for the apparatus powered by the safety arrangement. It should also be understood that cavity 11 may take on different shapes including curved surfaces but there should be at least two planar regions on the surfaces that lie in planes which intersect to form a dihedral angle. The dihedral angle should have a value, in this instance, so that the connector assembly and fuse holder mounted on the planar regions physically interfere to provide the interlocking safety feature.

What is claimed is:

1. A safety arrangement for electrically powered apparatus, said apparatus having at least two surfaces having regions that are substantially planar, each region having an orientation corresponding to one of two planes that intersect forming a dihedral angle, the arrangement comprising disengagable electrical connecting means mounted to one of said regions for powering said apparatus, fusing means mounted to the other of said regions and being in circuit with said connecting means, and said connecting means and said fusing means being mounted in close proximity to each other and the dihedral angle having a predetermined value such that said connecting means directly blocks withdrawl of said fusing means, to said fusing means is obstructed by said connecting means making disengagement of said electrical connecting means necessary to gain access to said fusing means, thereby insuring that said apparatus is disconnected from a powering potential before said fusing means is contacted.

2. A safety arrangement in accordance with claim 1 wherein said two surfaces are walls of a cavity formed in the rear of said apparatus, and said cavity is of sufficient size to prevent protrusion of said electrical connecting means from the rear of said apparatus.

3. A safety arrangement in accordance with claim 2 wherein said fusing means comprises at least one panel mounted fuse holder containing an appropriate fuse.

* * * * *

UNITED STATES PATENT AND TRADEMARK OFFICE
CERTIFICATE OF CORRECTION

PATENT NO. : 3,965,397
DATED : June 22, 1976
INVENTOR(S) : George D. Pearsall, Jr.

It is certified that error appears in the above-identified patent and that said Letters Patent are hereby corrected as shown below:

In the claims, column 3, lines 6 and 7, delete "to said fusing means is obstructed by said connecting means".

Signed and Sealed this

Seventh Day of September 1976

[SEAL]

*Attest:*

RUTH C. MASON
*Attesting Officer*

C. MARSHALL DANN
*Commissioner of Patents and Trademarks*